May 4, 1965 J. C. FITCH 3,181,753
STOWABLE LUGGAGE RACK
Filed July 27, 1962 2 Sheets-Sheet 1
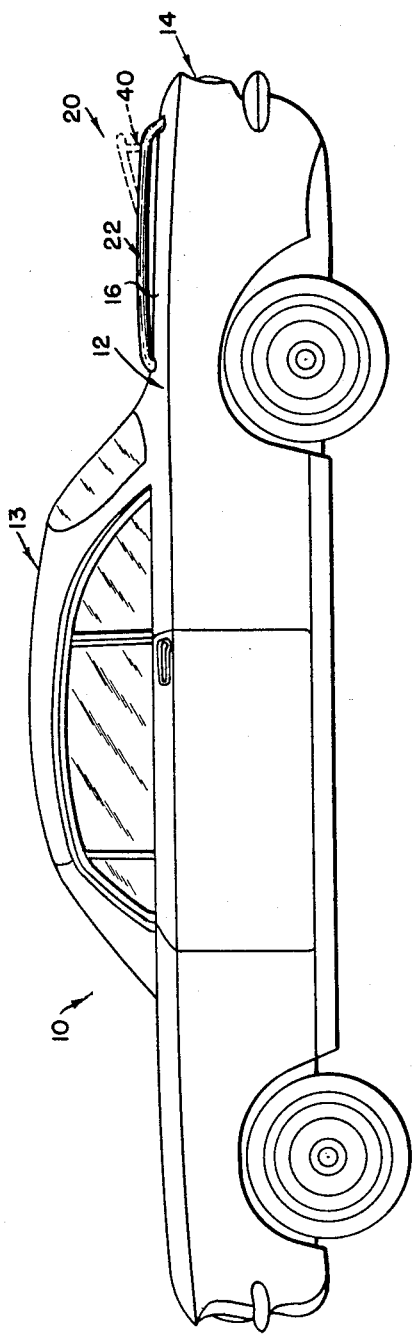
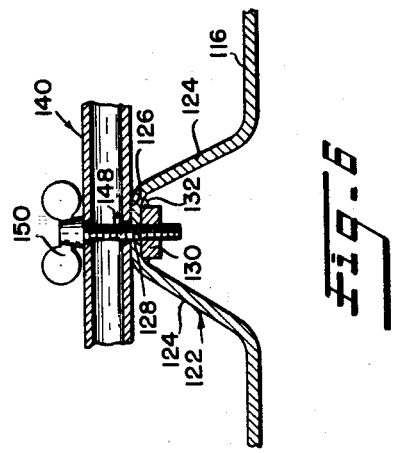
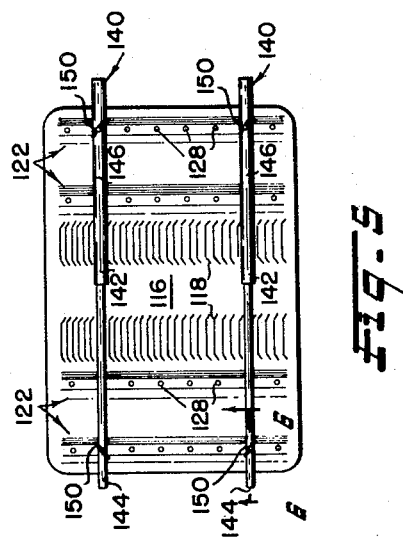
INVENTOR
John C. Fitch
BY *Strauch, Nolan & Neale*
ATTORNEYS May 4, 1965 J. C. FITCH 3,181,753
STOWABLE LUGGAGE RACK
Filed July 27, 1962 2 Sheets-Sheet 2

INVENTOR
John C. Fitch

BY Strauch, Nolan + Neale
ATTORNEYS

United States Patent Office 3,181,753
Patented May 4, 1965

3,181,753
STOWABLE LUGGAGE RACK
John C. Fitch, Lime Rock, Conn.
Filed July 27, 1962, Ser. No. 212,946
1 Claim. (Cl. 224—29)

The present invention pertains to improvements in luggage racks for vehicles, particularly automobiles. Specifically, the invention provides a luggage rack of novel construction which includes portions that may be stowed when not in use. The remaining portions of the rack are relatively permanently attached to the vehicle and are formed to harmonize with and add to the appearance of the car. The novel construction of the luggage rack also permits selective adjustment of the rack to fit various sized loads.

The current trend to smaller automobiles has produced a problem of inadequate interior luggage carrying space. This is particularly acute in rear engine cars since the size of a front luggage compartment is restricted by large front wheel wells and a forward extending foot well of the passenger compartment. Consequently, a need for convenient exterior luggage carrying capability commensurate with pleasing design and appearance has arisen.

In view of these considerations, a primary object of this invention is to provide an improved exterior luggage rack for vehicles in which portions of the rack may be easily and quickly moved to a stowed position or readily reinstalled in an operative position without the use of tools.

Other objects of the invention are:
(1) To provide an improved luggage rack for a vehicle having longitudinal load supporting bed members and removable transverse load braces in which the latter may be stowed within the vehicle;
(2) To provide an improved luggage rack which has load braces that are selectively connected to load supporting bed members so as to accommodate various sized loads;
(3) To provide an improved luggage rack in which selectively positioned, telescoping load braces may be secured in position by U-shaped, rubber lined or other locating and insulating fittings which frictionally engage load supporting bed bars upon telescopic movement of the load braces.
(4) To provide an improved luggage rack for a vehicle in which longitudinal load supporting bed members are integrally pressed in an exterior body surface of the vehicle and are provided with a plurality of longitudinally spaced openings and in which transverse load braces have manually releasable connecting means to selectively engage the openings; and
(5) To provide improved load braces for a luggage rack which are adapted to selectively engage the rack to accommodate various sized loads.

Further objects will appear from the following description and appended claim when read in conjunction with the accompanying drawings wherein:

FIGURE 1 is a side elevation of an automobile with a luggage rack of the invention mounted on its rear deck;

FIGURE 5 is a top plan showing the rear deck lid of an automobile with a modified luggage rack thereon; and FIGURE 6 is a section taken on line 6—6 of FIGURE 5.

Figure 2:
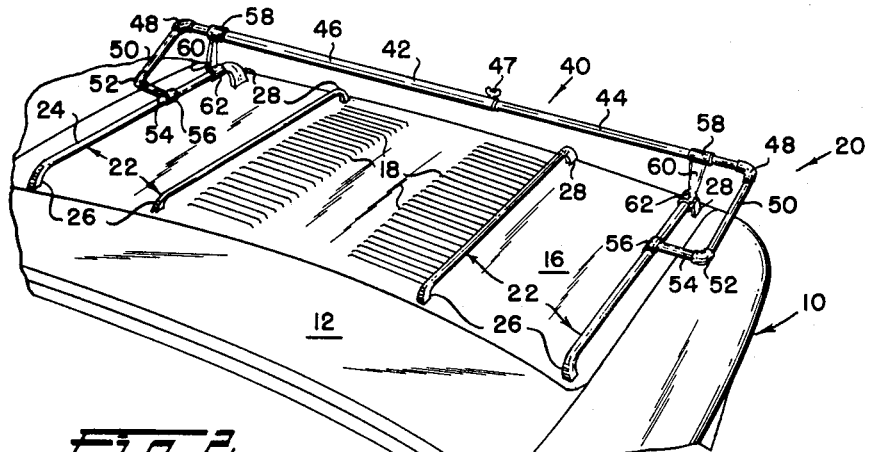
FIGURE 2 is a perspective view of the rear deck area and luggage rack of FIGURE 1.

Referring to the drawings in detail, FIGURE 1 shows an automobile 10 which for purposes of illustrating a particularly advantageous application of the invention is a rear engined car having a flat rear deck 12 extending over the engine compartment 14. Rear deck 12 has a hinged lid 16 which in front engined cars would be a trunk lid. The luggage rack assembly indicated generally at 20 is shown mounted on rear deck lid 16. However, the rack 20 may be mounted on another exterior body surface of an automobile 10 such as roof 13.

Figure 3:
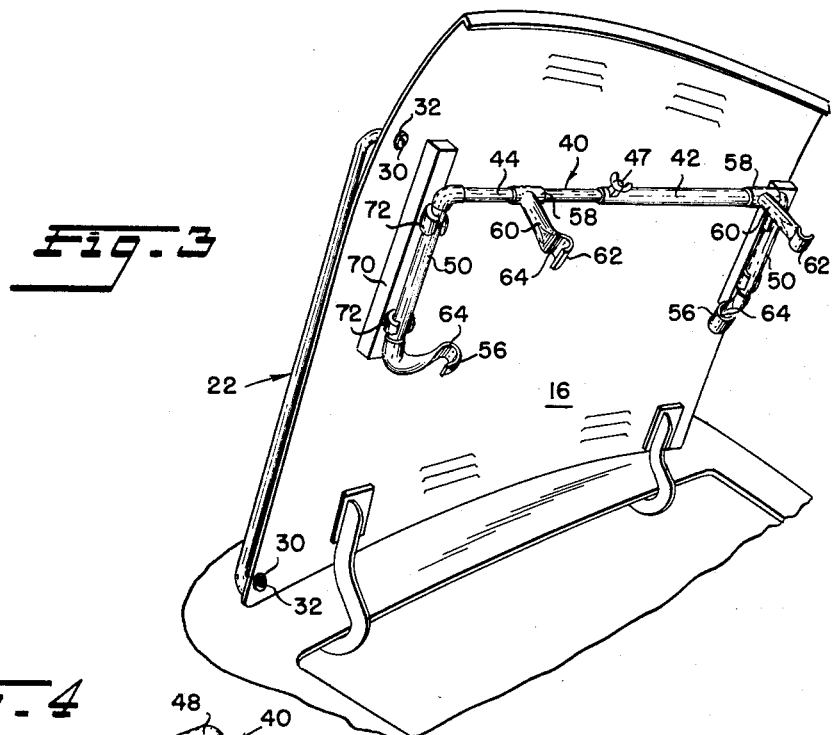
FIGURE 3 is another perspective view of the rear deck area and luggage rack of FIGURE 1 showing the deck lid in its open position and the removable portion of the luggage rack stowed in brackets on the underside of the lid.
Figure 4:
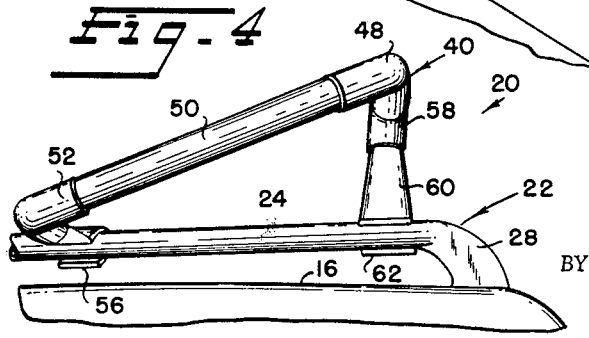
FIGURE 4 is a side elevation of a portion of the rear deck lid and luggage rack of FIGURE 1.

As shown in FIGURES 1 to 4, luggage rack 20 comprises substantially horizontal longitudinal load supporting bed members 22 and transverse, removable load braces 40. A plurality of load supporting bed members 22 is provided; two are placed outboard near the side edges of rear deck lid 16, and two are placed inboard adjacent engine compartment air louvers 18. Load supporting bed members 22 comprise load supporting bed bars 24 having forward end portions 26 and rearward end portions 28 which are formed to position bars 24 slightly above rear deck lid 16. Load supporting bed members 22 are suitably connected to rear deck lid 16 as by bolts 30 in conjunction with washers 32 (FIGURE 3). However, if it is desirable to make bed members 22 manually removable from rear deck lid 16, fasteners such as wing bolts could be used.

The removable load brace 40 comprises a crossbar 42 having telescoping sections 44 and 46. Section 44 slidably engages the interior surface of section 46 and may be securely clamped in telescopic relation thereto by means of wing bolt 47 threaded through one wall of section 46. Crossbar 42 terminates in tubular elbows 48 from which end bars 50 extend forwardly and downwardly and terminate at elbows 52. Short cross pieces 54 extend inwardly from tubular elbows 52 and terminate in U-shaped fittings 56 which selectively engage bed bars 24. Further, load brace 40 also includes vertical spacing arms 60 which are connected to crossbar 42 by means of T fittings 58. Spacing arms 60 terminate in U-shaped fittings 62 which also selectively engage bed bars 24. Arms 60 serve to elevate crossbar 42 a suitable distance above bed bars 24 so as to brace the load against horizontal shifting. U-shaped fittings 56 and 62 are shaped to fit around three sides of bed bars 24 and are respectively lined with rubber elements 64 to provide suitable frictional contacting surfaces for secure engagement with bed bars 24.

As shown in FIGURE 3, load brace 40 may be stowed on the under side of deck lid 16 as by means of suitable stowage bracket blocks 70 and spring clips 72 mounted thereon.

The operation of the principal embodiment is as follows. A load to be carried on luggage rack 20 such as a suitcase, not shown, is placed on load supporting bed members 22. Load brace 40, having been previously removed from the stowed position beneath rear deck lid 16, is suitably adjusted in position on bed bars 24 so as to provide the most adequate support for the load carried. Thus, telescopic crossbar 42 may be shortened so that the load brace 40 may be engaged with the inboard load supporting bed members 22 as well as those outboard. Further, as can be seen in the drawings, U-shaped fittings 56 and 62 of load brace 40 may be selectively engaged at any longitudinal position along bed bars 24. This selective longitudinal and transverse adjustment ensures versatile bracing of loads of different sizes.

When load brace 40 is properly adjusted both longitudinally and transversely to provide the best support for the luggage carried, the rubber lined U-shaped fittings 56 and 62 are aligned with bed bars 24. The crossbar 42 then manually extended to force fittings 56 and 62 into a loaded frictional fit with the bed bars 24. The crossbar 42 is then locked in that extended position by means of wing bolt 47.

When luggage brace 40 is not needed, it may be stowed out of sight in some such suitable spot as upon the under side of deck lid 16. To accomplish this, brace 40 is manually removed from its operative position on bed bars 24 by loosening wing bolt 47, shortening crossbar 42, and thus disengaging U-shaped fittings 56 and 60 from bed bars 24. The load brace 40 is then snapped into its stowed position in spring clips 72 below deck lid 16. The removal of transverse brace 40 leaves only longitudinally extending bed members 22 exposed on the exterior of the automobile.

It may be desirable to use a second load brace 40, not shown, at the forward end of load supporting bed members 22. Such a second load brace would normally be placed on bed members 24 is a position longitudinally reversed from that shown for the first brace 40. This second load brace would be particularly helpful to prevent the load carried from shifting forward during deceleration of the automobile.

It may be desirable from design and/or economic considerations to provide load supporting bed members which are pressed directly into an exterior surface of the automobile. Thus in FIGURES 5 and 6, such a modified embodiment of the invention is shown. Load supporting bed members or ribs 122 are formed as an integral part of deck lid 116. Lid 116 may include air louvers 118. Longitudinal ribs 122 have side portions 124 and relatively flat top portions 126. Provided along top portions 126 at longitudinally spaced intervals are openings or holes 128. Aligned with holes 128 and on the under side of lid 116 are nuts 130 suitably secured to deck lid 116 as by welding at 132.

Load braces 140 in this embodiment take the form of substantially straight crossbars 142. Crossbars 142 comprise telescoping sections 144 and 146. Each section is provided with openings 148 to receive wing bolts 150. Wing bolts 150 are selectively engageable with nuts 130 under openings 128 and thus selectively secure load braces 140 in any desired position.

As in the first embodiment of the invention, the load braces 140 may be telescopically shortened and selectively secured to the inboard bed ribs adjacent louvers 118 instead of the outboard ribs shown in FIGURE 5. However, no locking device between the two telescopic sections 144 and 146 is necessary in this embodiment because of the use of wings bolts 150 to connect the load braces to the bed members.

Further, load braces 140 may be manually removed and stored under the rear deck lid in a manner similar to that described for the first embodiment.

In either embodiment, the inboard load supporting bed members 22 or 122 serve to support small pieces of luggage even though the load braces 40 or 140 are extended and secured to the outboard load supporting bed members in order to accommodate larger pieces of luggage carried concurrently with the small pieces.

In either of the embodiments above, it may be desirable to use the load supporting bed members of the luggage rack without the load braces. This might be the case when carrying large loads which may be longer than the bed members or wider than the maximum adjusted width of the load braces. In such cases, the transverse load braces may be left in their stowed position.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by Letters Patent is:

A stowable luggage rack for a vehicle having an exterior body surface comprising, a plurality of elongated longitudinal load supporting bed bar members extending along the exterior of the body surface, said bed bar members having end portions connected to the exterior of the body surface of the vehicle to support said bed bar members in raised relation thereto; an elongated transverse load bracing cross bar comprising telescopic sections and locking means to secure said sections in fixed telescopic relation, and means detachably securing said cross bar to said bed bar members to permit manual movement of said cross bar to an inoperative stowed position comprising spacing arms and end bars extending from said cross bar, said spacing arms and said end bars having fittings to selectively engage said bed bar members, said fittings being engaged with said bed bar members when said cross bar is extended whereby said fittings may be selectively engaged with said bed bar members and tightly secured thereto by manual telescopic movement and locking of said cross bar.

References Cited by the Examiner

UNITED STATES PATENTS 3,002,664  10/61  Guevara.

FOREIGN PATENTS 454,248  1/50  Italy.
1,027,635  2/53  France.
1,142,611  4/57  France.

HUGO O. SCHULZ, *Primary Examiner.*

MORRIS TEMIN, *Examiner.*